(12) United States Patent
Biler et al.

(10) Patent No.: US 8,264,819 B2
(45) Date of Patent: Sep. 11, 2012

(54) POLYMER BASED SOLID STATE CAPACITORS AND A METHOD OF MANUFACTURING THEM

(75) Inventors: Martin Biler, Novy Jicin (CZ); Zdenek Sita, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 329 days.

(21) Appl. No.: 12/064,052

(22) PCT Filed: Aug. 18, 2006

(86) PCT No.: PCT/GB2006/003096
§ 371 (c)(1),
(2), (4) Date: Jul. 22, 2008

(87) PCT Pub. No.: WO2007/020458
PCT Pub. Date: Feb. 22, 2007

(65) Prior Publication Data
US 2009/0154058 A1  Jun. 18, 2009

(30) Foreign Application Priority Data

Aug. 19, 2005  (GB) .................................. 0517084.0
Aug. 26, 2005  (GB) .................................. 0517475.0

(51) Int. Cl.
*H01G 9/02* (2006.01)
*H01G 9/00* (2006.01)

(52) U.S. Cl. ....................................... 361/525; 29/25.03

(58) Field of Classification Search .................. 361/323, 361/525–527, 532; 29/25.03
See application file for complete search history.

(56) References Cited

U.S. PATENT DOCUMENTS

| | | | |
|---|---|---|---|
| 3,345,545 A | 10/1967 | Bourgault et al. |
| 4,084,965 A | 4/1978 | Fry |
| 4,118,727 A | 10/1978 | Laplante |
| 4,149,876 A | 4/1979 | Rerat |
| 4,722,756 A | 2/1988 | Hard |
| 4,910,645 A | 3/1990 | Jonas et al. |
| 4,957,541 A | 9/1990 | Tripp et al. |
| 5,098,485 A | 3/1992 | Evans |
| 5,198,187 A | 3/1993 | Lu et al. |
| 5,306,479 A | 4/1994 | Sommers |

(Continued)

FOREIGN PATENT DOCUMENTS

CN  1549286  11/2004

(Continued)

OTHER PUBLICATIONS

Abstract of Canadian Patent No. CA 2 018 346 dated Dec. 8, 1990.

(Continued)

*Primary Examiner* — Eric Thomas
(74) *Attorney, Agent, or Firm* — Dority & Manning, P.A.

(57) ABSTRACT

The present invention relates to a solid state capacitor having a conductive polymer cathode layer counter electrode that includes an acrylate binder and a method for its manufacture. In particular the present invention relates to a solid state capacitor comprising: providing a porous anode body of valve action material; forming a dielectric layer on said porous body; forming a cathode layer in contact with the dielectric layer, which cathode layer comprises a conductive polymer and an acrylic binder; and providing an anode terminal in electrical connection with the porous body anode and a cathode terminal in electrical connection with the cathode layer and a method for its manufacture.

21 Claims, 3 Drawing Sheets

U.S. PATENT DOCUMENTS

| | | | |
|---|---|---|---|
| 5,357,399 A | 10/1994 | Salisbury | |
| 5,432,223 A | 7/1995 | Champagne et al. | |
| 5,457,862 A | 10/1995 | Sakata et al. | |
| 5,473,503 A | 12/1995 | Sakata et al. | |
| 5,495,386 A | 2/1996 | Kulkarni | |
| 5,729,428 A | 3/1998 | Sakata et al. | |
| 5,812,367 A | 9/1998 | Kudoh et al. | |
| 5,949,639 A | 9/1999 | Maeda et al. | |
| 5,993,513 A | 11/1999 | Fife | |
| 6,043,191 A * | 3/2000 | Imamura et al. | 503/204 |
| 6,051,044 A | 4/2000 | Fife | |
| 6,072,694 A | 6/2000 | Hahn et al. | |
| 6,115,235 A | 9/2000 | Naito | |
| 6,165,623 A | 12/2000 | Fife et al. | |
| 6,312,642 B1 | 11/2001 | Fife | |
| 6,322,912 B1 | 11/2001 | Fife | |
| 6,338,816 B1 | 1/2002 | Fife | |
| 6,344,169 B2 | 2/2002 | Tsuchida et al. | |
| 6,365,094 B1 | 4/2002 | Hinzmann et al. | |
| 6,373,685 B1 | 4/2002 | Kimmel et al. | |
| 6,375,704 B1 | 4/2002 | Habecker et al. | |
| 6,391,275 B1 | 5/2002 | Fife | |
| 6,402,066 B1 | 6/2002 | Habecker et al. | |
| 6,416,730 B1 | 7/2002 | Fife | |
| 6,420,043 B1 | 7/2002 | Fife et al. | |
| 6,455,443 B1 | 9/2002 | Eckert et al. | |
| 6,462,934 B2 | 10/2002 | Kimmel et al. | |
| 6,517,645 B2 | 2/2003 | Fife | |
| 6,522,527 B2 | 2/2003 | Kojima et al. | |
| 6,527,937 B2 | 3/2003 | Fife | |
| 6,563,695 B1 | 5/2003 | Suzuki et al. | |
| 6,576,099 B2 | 6/2003 | Kimmel et al. | |
| 6,592,740 B2 | 7/2003 | Fife | |
| 6,616,728 B2 | 9/2003 | Fife | |
| 6,639,787 B2 | 10/2003 | Kimmel et al. | |
| 6,674,635 B1 | 1/2004 | Fife et al. | |
| 6,702,869 B2 | 3/2004 | Habecker et al. | |
| 6,706,240 B2 | 3/2004 | Habecker et al. | |
| 6,759,026 B2 | 7/2004 | Kimmel et al. | |
| 6,821,314 B1 | 11/2004 | Reichert et al. | |
| 6,835,225 B2 | 12/2004 | Naito et al. | |
| 6,987,663 B2 | 1/2006 | Merker et al. | |
| 7,025,795 B2 | 4/2006 | Monden et al. | |
| 7,116,548 B2 | 10/2006 | Satterfield, Jr. et al. | |
| 7,125,764 B2 | 10/2006 | Taketani et al. | |
| 7,149,074 B2 | 12/2006 | Kimmel et al. | |
| 7,154,740 B2 | 12/2006 | Merker et al. | |
| 7,156,893 B2 | 1/2007 | Habecker et al. | |
| 7,157,073 B2 | 1/2007 | Motchenbacher et al. | |
| 7,220,397 B2 | 5/2007 | Kimmel et al. | |
| 7,241,436 B2 | 7/2007 | Fife | |
| 7,341,705 B2 | 3/2008 | Schnitter | |
| 2005/0013765 A1 | 1/2005 | Thomas et al. | |
| 2005/0103638 A1 | 5/2005 | Schnitter et al. | |
| 2005/0150576 A1 | 7/2005 | Venigalla | |
| 2005/0199321 A1 | 9/2005 | Spaniol | |
| 2005/0248910 A1 * | 11/2005 | Merker | 361/525 |
| 2006/0262490 A1 * | 11/2006 | Saitou et al. | 361/540 |
| 2007/0072362 A1 | 3/2007 | Tseng et al. | |
| 2007/0121276 A1 | 5/2007 | Uzawa et al. | |
| 2009/0168304 A1 * | 7/2009 | Saito et al. | 361/524 |
| 2010/0214723 A1 * | 8/2010 | Karnik | 361/528 |

FOREIGN PATENT DOCUMENTS

| | | |
|---|---|---|
| CN | 1565779 | 1/2005 |
| EP | 0698435 A1 | 2/1995 |
| EP | 0688030 A1 | 12/1995 |
| EP | 1598841 A1 | 11/2005 |
| EP | 1713103 A1 | 10/2006 |
| JP | 11016783 A * | 1/1999 |
| SU | 1057995 A | 11/1983 |
| WO | WO 9738143 A1 | 10/1997 |
| WO | WO 9819811 A1 | 5/1998 |
| WO | WO 9830348 A1 | 7/1998 |
| WO | WO 9838660 A1 | 9/1998 |
| WO | WO 0015555 A1 | 3/2000 |
| WO | WO 0111638 A1 | 2/2001 |
| WO | WO 0237536 A2 * | 5/2002 |
| WO | WO 0245107 A1 | 6/2002 |
| WO | WO 2005076297 A1 | 8/2005 |
| WO | WO 2007020458 A1 | 2/2007 |
| WO | WO 2007020464 A1 | 2/2007 |
| WO | WO 2007026165 A1 | 3/2007 |

OTHER PUBLICATIONS

Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP3053511 dated Mar. 7, 1991.
Abstract of Japanese Patent No. JP4026709 dated Jan. 29, 1992.
Abstract of Japanese Patent No. JP4070594 dated Mar. 5, 1992.
Abstract of Japanese Patent No. JP53092977 dated Aug. 15, 1978.
*Change in Porous Structure and Leakage Currents of Niobium Capacitor Anodes During Electrolytic Oxidation*, Levinskiy, et al., Poroshkovaya Metallurgiya, No. 3, 1991, pp. 56-59.
*Charge Carrier Transport and Storage in NbO Capacitors*, Sikula et al., CARTS Europe, Oct. 21, 2004, 4 pages.
*Conductivity Mechanisms and Breakdown Characteristics of Niobium Oxide Capacitors*, Sikula et al., AVX Corporation 2003, 5 pages.
*Conductivity Mechanisms and Breakdown of NbO Capacitors*, Sikula et al., CARTS USA, Mar. 19, 2004, 7 pages.
*Electrolytic Capacitors*, Electrochemical Society Reviews and News, vol. 24, No. 12, Dec. 1977, pp. 408C-409-C.
*Extended Range NbO Capacitors Through Technology and Materials Enhancements*, Zednicek, et al., CARTS USA, Mar. 24, 2005, 5 pages.
*Intrinsically Electrically Conductive Polymers (ICPs) from Plastics Materials* by J. A. Brydson, $7^{th}$ Edition, 1999, pp. 886-889.
*Investigation of Columbium as an Electrolytic Capacitor Anode, Part II*, Peabody, U.S. Army Signal Research and Development Laboratory, Fort Monmouth, NJ, DA Task NR. 3A99-15-003-04, 1962, pp. 1-11.
*Low ESR and Low Profile Technology on Niobium Oxide*, Zednicek et al., AVX Corporation 2003, 9 pages.
*NbO Capacitor Parameters Improvement, Leakage Current Mechanism and Anodic Oxidation*, Sikula et al., Mar. 30, 2005, 7 pages.
*New Tantalum Technologies, Tantalum Polymer, and Niobium Oxide Capacitors*, T. Zedníček, CARTS Europe Prague, Oct. 19, 2005, 7 pages.
*Niobium Oxide and Tantalum Capacitors: M-I-S Model Parameters Comparison*, Sikula et al., CARTS USA, Mar. 24, 2005, 4 pages.
*Niobium Oxide set to beat the pants off tants*, CIE (Components in Electronics), Aug. 2007.
*Niobium Oxide Technology Roadmap*, Zednicek et al., AVX Corporation, T. Zednicek et al., CARTS Europe Nice, Oct. 15, 2002, 5 pages.
Chemical Structure of gamma-Glycidoxypropyltrimethoxysilane from Si Power Chemical Corporation—SiSiB® Silane Coupling Agent, SiSiB® PC3100.

* cited by examiner

Fig. 1  Lead-free reflow profile
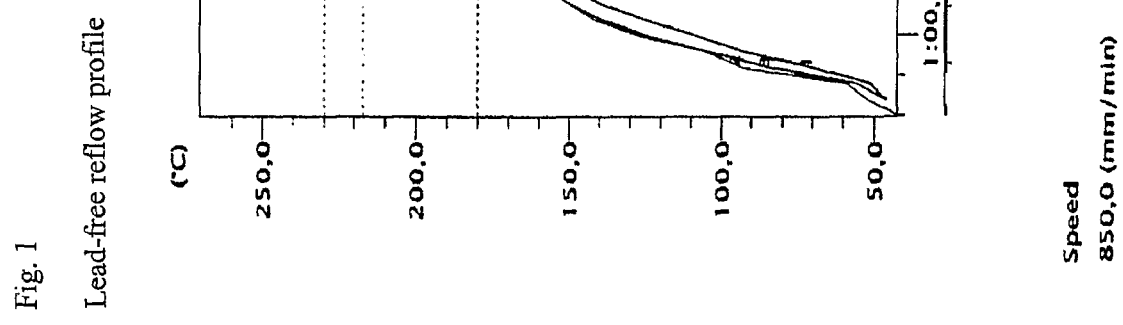

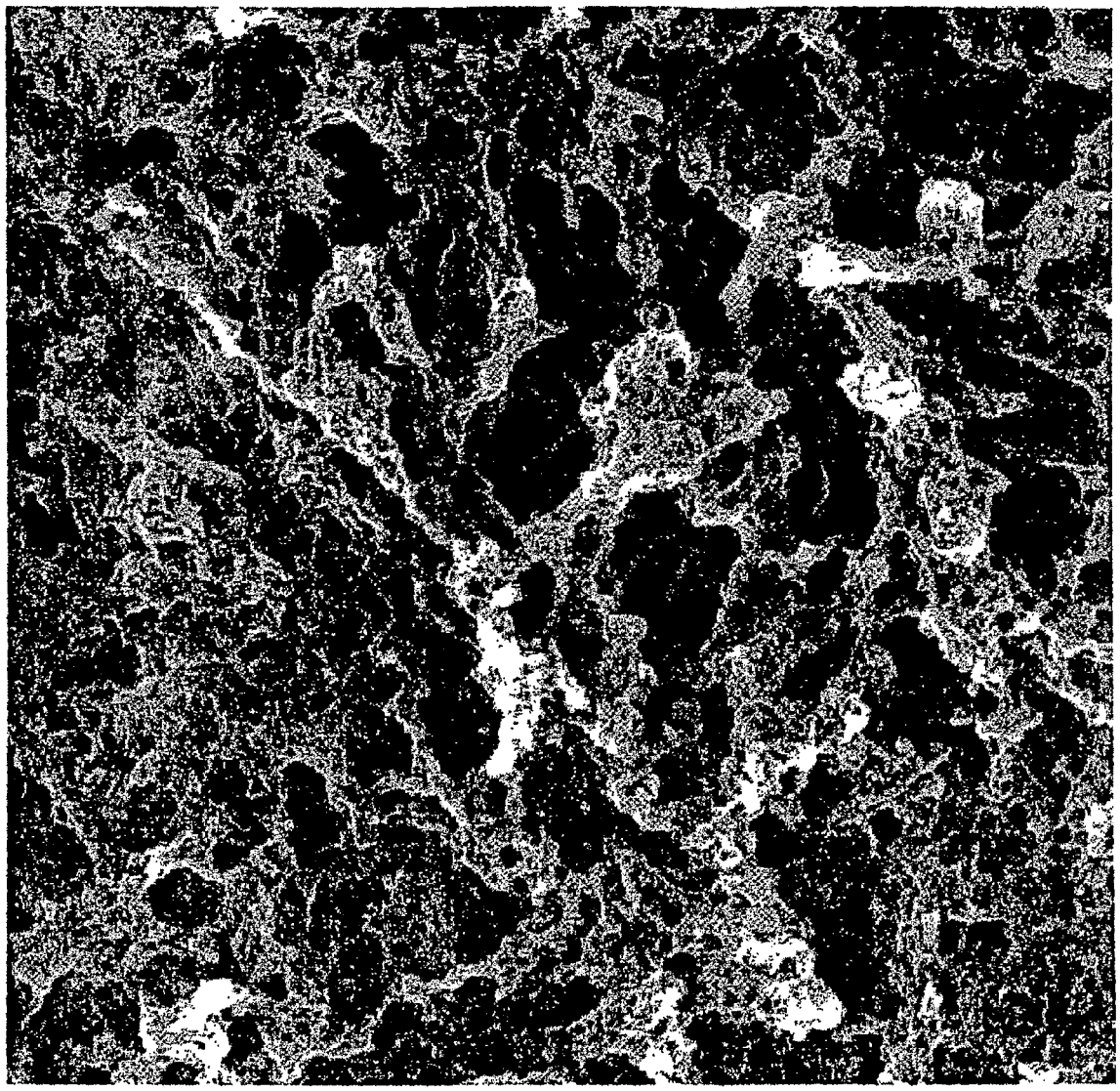
Fig 2: NO HEMA

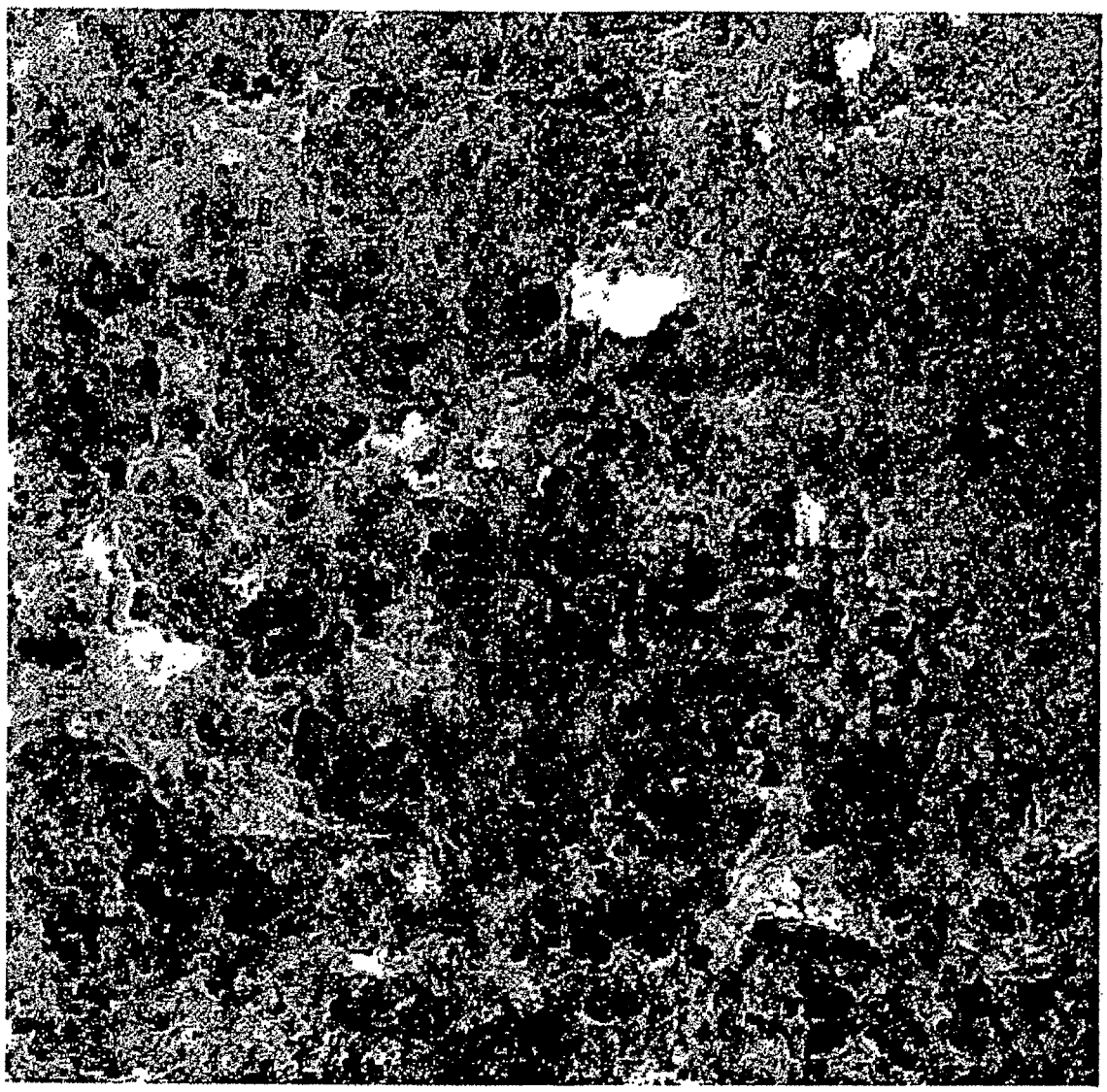
Fig 3: HEMA

POLYMER BASED SOLID STATE CAPACITORS AND A METHOD OF MANUFACTURING THEM

RELATED APPLICATIONS

The present application claims priority to PCT/GB2006/003096 (filed on Aug. 18, 2006), which claims priority to GB0517084.0 (filed on Aug. 19, 2005) and GB0517475.0 (filed on Aug. 26, 2005).

The present invention concerns a solid state capacitor having a conductive polymer cathode layer counter electrode comprising an acrylate, and a method of manufacturing such solid sate capacitors. These show enhanced electrical and mechanical properties as compared to conventional conductive polymer-based capacitors.

Solid state capacitors are valued due in large measure to the fact that extremely high capacitances may be provided in a relatively limited volumetric space due to the large surface area and thin dielectrics provided within such a capacitor. Solid state capacitors are manufactured in the art by the method of providing a powdered mass of solid state capacitor forming material, compressing the mass to form a predetermined shape, sintering the compressed mass to integrate the mass into a unitary porous body, chemically reacting, e.g. by anodising the porous mass to form a dielectric coating over the surfaces within the mass, and thereafter forming a conductive coating over the dielectric coating. In such solid state capacitors the components which have been anodised define the anode of the capacitor and the conductive coating over the dielectric forms the cathode or counter electrode.

A variety of solid state materials have been employed in the art to form the anode and dielectric. The principal solid state capacitor forming materials are so called valve action materials in which a dielectric layer is readily formed on the conductive substrate. Important examples are tantalum (columbium) metal, niobium metal and conductive niobium sub-oxides, such the monoxide. Conductive niobium nitrides are also candidates. Niobium based capacitors have been known for thirty years, but the performance of such capacitors has been restricted in part by the quality of niobium powders available.

Tantalum capacitors made according to the method disclosed in (Salisbury EP patent 0688030, AVX Corporation) have proved extremely successful and are capable of providing very high volumetric efficiency and very small component sizes, particularly useful for mobile telecommunications devices and other applications where miniaturisation is required.

More recently, capacitors have been developed having an anode made of niobium monoxide and dielectrics based on niobium pentoxide. The formation of capacitor grade niobium oxide anodes from oxide reduced niobium oxide powder is described in U.S. Pat. No. 6,322,912 (Fife et al), U.S. Pat. No. 6,391,275 (Fife et al), U.S. Pat. No. 6,416,730 (Fife et al), U.S. Pat. No. 6,576,099 (Kimmel et al), U.S. Pat. No. 6,592,740 (Fife et al) and U.S. Pat. No. 6,639,787 (Kimmel et al).

The cathode of conventional solid state capacitors is made principally from manganese dioxide and is formed by a process generically termed manganizing. In this process, a conductive counter electrode coating is formed over the dielectric formed from anodizing. The manganizing step is typically performed by dipping the anodized device in a solution of manganous nitrate and heating the impregnated device in a moist atmosphere to convert the nitrate to a solid conductive manganese dioxide. The use of manganese dioxide as the cathode has some disadvantages. Firstly, its bulk conductivity after application into the porous structure of typical capacitors is typically 0.1 S/cm. Such high bulk conductivity negatively influences the total ESR (equivalent series resistance) of the capacitor at low and medium frequencies. Furthermore, manganese dioxide is a strong oxidising agent. When a part of a capacitor is overheated, manganese dioxide is able to supply a lot of oxygen thus exacerbating thermal runaway of the capacitor.

Capacitors comprising conductive polymers have been developed to overcome the problems associated with manganese dioxide when used with tantalum capacitors. Such polymer based capacitors have a conductivity as high as 10 to 100 S/cm, which is sufficient to transfer electrical current from the dielectrics to the external contacts without significant loss. Such capacitors are used for high frequency applications due to the low losses caused by low ESR. Polymer based counter electrodes also show healing properties and sufficient thermal stability.

However, the polymer based counter electrodes in the art have a number of disadvantages. These include a tendency to fail due to the polymer layer being brittle and not able to survive the thermo-mechanical stresses of manufacture, testing and in-service conditions.

U.S. Pat. No. 5,729,428 (Sakata et al) describes the use of electron donors in organic layers as adhesives for improving the adhesion of a conductive polymer to valve metal oxide films. U.S. Pat. No. 5,729,428 suggests that the adhesive is directly applied to dielectrics by vapour or dipping into solution. Fatty acids, aromatic carboxylic acids, anionic surface active agents such as carboxylates or sulphonates, phenol and its derivatives, silane or aluminium or titanium coupling agents, are described as possible adhesives due their ability to form covalent bonds with valve metal atoms in the dielectrics. As a result, electrons are supplied to the oxide to restore the potential barrier while permitting the stable presence of an electron donor organic compound on the oxide film. The resulting capacitor showed improved leakage current and stability at high temperatures.

U.S. Pat. No. 6,072,694 (Hahn et al) describes the addition of silane based coupling agents directly in a polymer solution. Effects comparable to the results of U.S. Pat. No. 5,729,428 were observed, with improvement in the adhesion of conductive polymer to metal oxide, thus decreasing the dissipation factor, ESR and DCL. The silane network is formed by physical bonding, which bonding is reversible by changes in composition of solvents or pH. Thus the network is prone to fail in service.

Whilst the foregoing methods permit the manufacture of capacitors, there is pressure to find alternatives to the silane coupling agents to enable the manufacture of polymer based capacitors having improved electrical and mechanical stability and, as a result, improved leakage current. The present invention seeks to address these problems, amongst others.

According to one aspect of the present invention there is provided a method of manufacturing a solid state capacitor comprising:

providing a porous anode body of valve action material;
forming a dielectric layer on said porous body;
forming a cathode layer in contact with said dielectric layer, which cathode layer comprises a conductive polymer and an acrylic binder; and
providing an anode terminal in electrical connection with the porous body anode and a cathode terminal in electrical connection with the cathode layer.

According to another aspect of the invention, there is provided a solid state capacitor comprising: a porous anode body of valve action material; a dielectric layer formed on said porous body; a cathode layer in contact with said dielectric layer, which cathode layer comprises a conductive polymer and an acrylic binder; and an anode terminal in electrical connection with the porous body anode and a cathode terminal in electrical connection with the cathode layer.

The use of an ester of an acrylic binder, such as a methacrylate, or a derivative thereof, has the advantage of improving the internal strength of the conductive polymer layer thus producing a capacitor having a surprisingly increased improvement of direct current leakage (DCL), polymer layer stability at high temperatures and which is able to withstand changes in composition of solvents and/or pH as compared to those polymer-based solid state capacitors of the prior art.

Said conductive polymer preferably comprises an intrinsically conductive polymer and a dopant for the polymer. Intrinsically conductive polymers (ICP's) are those which do not require the addition of conductive material filler (such as carbon black) in order to exhibit conductivity. ICP's rely upon the availability of excess charge for conduction. Such free charge may be provided by a dopant, typically an oxidising or reducing agent. ICP's are discussed in Plastics Materials, by J A Brydson $7^{th}$ Edition (1999) pp 886 to 889. In the present case, the conductive polymer is preferably a polymer of a monomer selected from an acetylene, a thiophene, a pyrrole or an aniline, or mixtures and co-polymers thereof.

The acrylic binder is preferably methacrylate. The methacrylate may be a methacrylate ester or a derivative thereof, having the general formula:

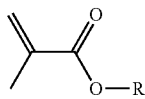

In a preferred embodiment the methacrylate is hydroxyethylmethacrylate (HEMA).

The binder such as HEMA may be present in the polymer in a concentration of 0.1 to 20 wt %, preferably 0.5 to 15 wt %, or 1 to 5 wt %.

The conductive polymer dopant may comprise a complex of a metal cation and an organic acid. The organic acid is, in a preferred embodiment, sulphonic acid. In one particular embodiment the dopant is Fe (III) tosylate.

The conductive polymer cathode layer may be applied as a liquid. The conductive polymer cathode layer may comprise a plurality of sequentially applied coatings of polymer. In any case, the conductive polymer layer may comprise a laminate of multiple layers of polymer.

In a preferred embodiment the conductive polymer layer is applied as a liquid monomer precursor solution which is polymerised in situ. The precursor solution preferably further comprises the binder, so that the binder is incorporated in the conductive polymer during polymerisation. Conveniently, the monomer solution may be polymerised electrochemically.

In capacitors according to the present invention is possible to obtain a DCL of less than 50 nA/CV, a specific charge capacity of from about 1,000 to 400,000 CV/g.

When the dielectric layer is formed by anodisation of the anode body, the formation voltage used in the anodisation is from 6 to 150 V.

In a capacitors of the present invention, the porous anode body is typically formed by moulding of "green" mixtures capacitor grade powder or particles in a suitable binder/lubricant. The pressed or moulded green anode pellets are then sintering to solidify and the lubricant burnt off or otherwise removed, for example chemically. Examples of the type of precursor powder that may be used include, flaked, angular, nodular, and mixtures or variations thereof. The powders include those having mesh sizes of from 0.1-500 μm. The porous anode body may be formed at a sintering temperature of from 1,100° C. to 1,900° C., more preferably from 1,300 to 1,500° C.

As a result of the powder metallurgical route used, a porous anode body may be created with a very large surface area.

The valve action material powders may be doped with nitrogen to provide a content of at least 2000 ppm.

A dielectric layer is formed on the surface of the porous anode body by anodic oxidation (anodisation, also known in the art as "formation"). The dielectric layer should exhibit a high dielectric constant, high electrical strength and low leakage current. Such properties enable the use of extremely thin dielectrics and to fully utilise the sponge structure of the anode. The dielectric layer is usually a stable oxide of the underlying conductive valve-action anode material. For example, the dielectric layer may comprise niobium pentoxide on niobium metal, niobium pentoxide on niobium suboxide, or tantalum pentoxide on tantalum metal. The dielectric layer may be formed on the surface of the porous sintered body anode by anodic oxidation or by other techniques which are known in the art.

A conductive polymer layer may be formed directly on the dielectric layer by polymerisation of a suitable monomer. Chemical polymerisation or electro-polymerisation may be used to form the polymer layer. Monomers which are able to create conjugated electron pairs may be used in the formation of the conductive polymer layer. Preferably the monomer is selected from aniline, thiophene, pyrrole or any one of their derivatives. Preferably the monomer is 3,4-ethylenedioxythiophene.

A suitable oxidant should be used in order to aid polymerisation of the required monomer on the surface of the dielectric layer. The monomer and oxidant may be deposited simultaneously or sequentially on to the surface of the dielectric layer. The dielectric surface may be coated with an oxidant before application of the monomer on the dielectric surface or the oxidant may be applied following application of the monomer and vice versa.

When electro polymerisation is used to form the counter electrode, oxidant is not required. The dielectric layer must first be pre-coated by a thin conductive coating, for example, a single layer of chemically deposited conductive polymer, to provide an electric contact to the anode. The monomer in the presence of dopant may then be electrochemically polymerised on the anode by applying a voltage to the anode.

The monomer or oxidant may be applied to the surface of the dielectric layer by any technique developed for the coating of porous bodies or chips, such as dipping in liquid, or painting. The monomer or oxidant may be applied in the form of a solution, spray or vapour. The oxidant for polymerization of a high conductive polymer may be any conventional cations having an oxidizing function and sufficient electron affinity. A suitable oxidant is Ferric ions. Fe (III) tosylate may be used.

A dopant may be required to make the intrinsically conductive polymer layer conductive. The surface of the dielectric layer may be coated simultaneously or sequentially by a dopant and monomer and oxidant. The anode may be coated with monomer before coating with oxidant and/or dopant solution and vice versa. The oxidant and dopant may be the same compound. In this case, iron (III) tosylate is the preferred oxidant/dopant. Organic or inorganic Lewis acids are suitable dopants. For example, the ions of organic sulphonic acids may be used.

The acrylic binder may be added to any of the oxidant, dopant and/or monomer solution at any time during which these components are utilized in the polymerisation procedure. The acrylic binder may be mixed with the monomer or oxidant and/or dopant before coating on said dielectric layer. The monomer, oxidant, dopant and acrylic binder may be coated on to the anode as a mixture in one solution. The dopant, monomer, oxidant and acrylic binder may be simultaneously coated on the dielectric surface. The monomer, dopant and oxidant may be coated on the dielectric surface separately and sequentially in any order. The monomer may be coated on the dielectric surface before the oxidant and dopant are coated on to the dielectric surface and vice versa. The acrylic binder, oxidant, dopant and monomer may be applied to the anode by any technique developed for the coating of porous bodies or chips. Preferably, dipping is used.

The above series of steps may be repeated so as to form the required number of polymer layers. Multiple conductive polymer layers may be provided. 1, 2 or 3 or more conductive polymer layers on the surface of the first polymer layer may be provided directly on the surface of the dielectric layer.

The solid state capacitor may have a DCL (DC leakage) of less than 50 nA/CV, preferably 20 nA/CV and more preferably 10 nA/CV.

The capacitor of the present invention may have a specific charge of from about 1,000 to 400,000 CV/g. Preferably, the specific charge may be from 30,000 to 150,000 CV/g and more preferably from 50,000 to 100,000 CV/g.

The capacitor of the present invention may have an anode preferably formed at a voltage of from about 6-150V, preferably from 10-50V. Other higher formation voltages may be used.

Anode and cathode termination means are provided. The anode and cathode termination means may include leads, wires or plates or surface coatings. Typically the terminal is capable of forming a soldered junction with a circuit or circuit board.

An anode wire, which functions as a connection from the porous sintered body anode to the anode termination may also be present. The anode wire may be pressed in to the porous sintered body anode or attached to the porous sintered anode body by welding, sintering or by other methods. The anode wire may be embedded or attached at any time before anodizing.

A cathode termination means may be connected to the cathode layer by welding, gluing or soldering the negative termination means to a graphite and silver layer provided on the surface of the cathode layer.

The porous sintered body anode, dielectric layer, cathode layer and cathode and anode terminations may be encapsulated (subject to exposure of terminal surfaces or connections) in an inert insulating material, such as epoxy or a silica filled thermoset.

Following is a description by way of example only of certain modes for putting the present invention into effect. Also provided are comparative examples which serve to demonstrate the benefits of the invention.

In the figures:

FIG. 1 is a lead-free reflow profile showing conditions used in determining the experimental results of Table 1.

FIG. 2 shows the structure of a counter electrode without presence of HEMA

FIG. 3 shows the structure of a counter electrode in accordance with the present invention with the presence of HEMA It can be seen by comparing FIGS. 2 and 3 that a counter electrode not having an acrylic binder has a more porous structure (FIG. 2) compared to a counter electrode having an acrylic binder (FIG. 3). Thus, the presence of the acrylic binder allows a counter electrode to adopt a structure which imparts more favourable electrical properties to a counter electrode.

EXAMPLES

The following Examples show the ability of an acrylic polymer binder, in particular formed from an ester of methacrylate, to permit the formation of a tantalum capacitor with excellent electrical properties.

Some 900 anode bodies having a capacitance of 100 µF/10V grade were produced. The anode bodies were each formed from tantalum powder having a CV of 50,000 µFV/g each being a pressed pellet of length 4.05 mm, width 3.6 mm and height 1.05 mm. The parts were then dielectric formed by anodising using a formation voltage of 31.4V to produce a dielectric layer on each pellet/anode body.

Sample A—Comparative

The first 180 anode bodies (Nos. 1-180) were produced without the presence of an ester of methacrylate and taken as a control. The anode parts were coated with eight layers of conductive polymer to form the conductive polymer coating. Specifically, each sample was first dipped into a solution containing 40% p-toluenesulphonate in butanol as oxidizer/dopant Baytron CB40 for five minutes. The samples were allowed to dry at room temperature for at least thirty minutes and then dipped into ethylenedioxothiophene (EDT) as a monomer for thirty seconds. The samples were allowed to dry at room temperature for at least thirty minutes so that polymerization could occur. The samples were then washed in two ethanol baths for five minutes each. This procedure was repeated eight times.

After each application of a conductive polymer layer, as described above, the part was anodised; the parts were dipped into a 10% sulphuric acid and 2% phosphoric acid solution for five minutes with applied 20 volts.

The samples were then terminated with graphite and silver coating by a sequential dipping technique.

Sample B Comparative (3-glycidoxypropyltrimethoxysilane in 4-% p-toluenesulphonate as Oxidizer/Dopant).

The second 180 anode bodies (Nos. 181-360) were coated sequentially with 3-glycidoxypropyltrimethoxysilane in oxidizer/dopant. 3-glycidoxypropyltrimethoxysilane was added to 40% p-toluenesulphonate in butanol at a concentration of 5 wt % and dissolved by continuous mixing for one hour.

The anode parts were coated with eight layers of conductive polymer to form the conductive polymer coating. Specifically, each sample was first dipped into a solution containing 40% p-toluenesulphonate in butanol as oxidizer/dopant for five minutes. The samples were allowed to dry at room temperature for at least thirty minutes and then dipped into EDT monomer for thirty seconds. The samples were allowed to dry at room temperature for at least thirty minutes so that polymerization could occur. The samples were then washed in two ethanol baths for five minutes each. This procedure was repeated eight times.

After each application of a conductive polymer layer, as described above, the anode body was anodised; the bodies being dipped into a 10% sulphuric acid and 2% phosphoric acid solution for five minutes with applied 20 volts.

The samples were then terminated with graphite and silver coating by a dipping technique.

Sample C (5% 2-hydroxyethylmethacrylate in 40% p-toluenesulphonate in Butanol as an Oxidizer/Dopant)

The third 180 anode bodies (Nos. 361-540) were coated sequentially with 2-hydroxyethylmethacrylate in the oxidizer/dopant. 2-hydroxyethylmethacrylate was added to 40% p-toluenesulphonate in butanol at a concentration of 5 wt % and dissolved by continuous mixing for one hour.

The anode bodies were coated with eight layers of conductive polymer to form the conductive polymer coating. Specifically, each sample was first dipped into a solution containing 40% p-toluenesulphonate in butanol as oxidizer/dopant for five minutes. The samples were allowed to dry at room temperature for at least thirty minutes and then dipped into EDT monomer for thirty seconds. The samples were allowed to dry at room temperature for at least thirty minutes so that polymerization could occur. The samples were then washed in two ethanol baths for five minutes each. This procedure was repeated eight times.

After each application of a conductive polymer layer, as described above, the part was also anodised in the same way. The parts were dipped into a 10% sulphuric acid and 2% phosphoric acid solution for five minutes with applied 20 volts.

The samples were then terminated with graphite and silver coating by dipping technique.

Sample D (1% 2-hydroxyethylmethacrylate in EDT as Monomer)

The fourth 180 anode bodies (Nos. 541-720) were coated sequentially with 2-hydroxyethylmethacrylate in the monomer. 2-hydroxyethylmethacrylate was added to PEDT monomer at a concentration of 5 wt % and dissolved by continuous mixing for one hour.

The anode bodies were coated with eight layers of conductive polymer to form the conductive polymer coating. Specifically, each sample was first dipped into a solution containing 40% p-toluenesulphonate in butanol as oxidizer/dopant for five minutes. The samples were allowed to dry at room temperature for at least thirty minutes and then dipped into EDT monomer for thirty seconds. The samples were allowed to dry at room temperature for at least thirty minutes so that polymerization could occur. The samples were then washed in two ethanol baths for five minutes each. This procedure was repeated eight times.

After each application of a conductive polymer layer, as described above, the anode bodies were anodised. The parts were dipped into a 10% sulphuric acid and 2% phosphoric acid solution for five minutes with applied 20 volts.

The samples were then terminated with graphite and silver coating by dipping technique.

Sample E (5% 2-hydroxyethylmethacrylate in EDT as Monomer)

The fifth 180 anode bodies (Nos. 721-900) were coated sequentially with 2-hydroxyethylmethacrylate in the monomer. 2-hydroxyethylmethacrylate was added to EDT monomer at a concentration 5 wt % and dissolved by continuous mixing for one hour.

The anode parts were coated with eight layers of conductive polymer to form the conductive polymer coating. Specifically, each sample was first dipped into a solution containing 40% p-toluenesulphonate in butanol oxidizer/dopant for five minutes. The samples were allowed to dry at room temperature for at least thirty minutes and then dipped into EDT monomer for thirty seconds. The samples were allowed to dry at room temperature for at least thirty minutes so that polymerization could occur. The samples were then washed in two ethanol baths for five minutes each. This procedure was repeated eight times.

After each application of a conductive polymer layer, as described above, the anode bodies were also allowed to anodize. The parts were dipped into a 10% sulphuric acid and 2% phosphoric acid solution for five minutes with applied 20 volts.

The samples were then terminated with graphite and silver coating by dipping technique.

All samples were completed processing to form final capacitors having anode and cathode terminals, by conventional assembly technology. The properties of the finished parts were measured. After measurement, the parts were subjected to lead-free reflow treatment under the conditions shown in FIG. 1. Electrical parameters were then measured after 24 hours annealing.

Accelerated humidity testing was performed to emphasize the effect of humidity before lead-free reflow. The parts were subjected to lead-free reflow according to FIG. 1. After reflow, the parts were allowed to relax for 1 hour and subjected to pressure cooker at 121° C. for 4 hrs. Then, after one hour relaxation, they were reflowed with the same profile again.

Results

In table 1 below, the electrical properties of control samples without binder (2-hydroxyethylmethacrylate) or the silane alternative are shown. Also shown are results of samples in which a binder is present in the conductive polymer, in particular in which derivatives of acrylates are added to 40% p-toluenesulphonate in butanol oxidant/dopant, or in two concentrations to EDT monomer:

|  | Sample No. | | | | |
| --- | --- | --- | --- | --- | --- |
|  | A | B | C | D | E |
| Sample description | Control | Silane | HEMA in oxidizer | HEMA in monomer | HEMA in monomer |
| Additive concentration (wt %) | 0 | 5 | 5 | 1 | 5 |
| DCL Yield improvement (%) | N.A | 3% | 6% | 4% | 10% |
| DCL (μA) | 3.7 | 3.0 | 3.5 | 3.6 | 3.4 |
| CAP (μF) | 104 | 92 | 101 | 102 | 100 |
| DF (%) | 1.5 | 2.2 | 2.0 | 2.1 | 2.0 |
| ESR (mΩ) | 38 | 36 | 36 | 37 | 35 |
| Reflow DCL failures (%) | 1.1% | 0% | 0% | 0% | 0% |
| Pressure cooker + reflow DCL failures (%) | 7.2% | 3.8% | 0.6% | 1.2% | 0.6% |

Table 1 shows that the presence of an acrylate polymer in the conductive polymer cathode layer improve various properties. This improvement is surprisingly more effective than the presence of 5% silane, even for samples having an acrylate content of only 1%.

It will be seen that DCL yield improves by between 4% and 10%. Capacitance is improved as compared to the silane control. There were no initial reflow DCL failures, and in particular a very low incidence of DCL failures after pressure cooking (i.e. after thermal shock).

The invention claimed is:

1. A method of manufacturing a solid state capacitor comprising:
providing a porous anode body of valve action material;
forming a dielectric layer on said porous body;

applying a composition to a surface of the dielectric layer, the composition containing a thiophene monomer and an acrylic polymer binder, wherein the binder is hydroxyethylmethacrylate;

polymerizing the monomer to form a cathode layer that is in direct contact with said dielectric layer, which cathode layer comprises an intrinsically conductive thiophene polymer and the acrylic polymer binder; and providing an anode terminal in electrical connection with the porous body anode and a cathode terminal in electrical connection with the cathode layer.

2. The method of claim 1 wherein said cathode layer comprises a dopant for the polymer.

3. The method of claim 2 wherein the dopant comprises a complex of a metal cation and an organic acid.

4. The method of claim 3 wherein the organic acid is a sulphonic acid.

5. The method of claim 4 wherein the dopant is Fe (III) tosylate.

6. The method of claim 1 wherein the binder is present in the polymer in a concentration of 0.1 to 20 wt %.

7. The method of claim 6 wherein the binder concentration is to 0.5 to 15 wt %.

8. The method of claim 1 wherein the monomer is polymerised electrochemically.

9. The method of claim 1 wherein the valve action material comprises tantalum metal or niobium metal or conductive niobium oxide.

10. The method according to claim 1 wherein the dielectric layer is formed by anodisation of the anode body and the formation voltage used in the anodisation is from 6 to 150 V.

11. The method of claim 1, wherein the conductive thiophene polymer is poly(3,4-ethylenedioxythiophene).

12. A solid state capacitor comprising:
a porous anode body of valve action material;
a dielectric layer formed on said porous body;
a cathode layer in direct contact with said dielectric layer, which cathode layer comprises an in situ polymerized conductive thiophene polymer and an acrylic polymer binder, wherein the binder is hydroxyethylmethacrylate; and
an anode terminal in electrical connection with the porous body anode and a cathode terminal in electrical connection with the cathode layer.

13. The capacitor of claim 12, wherein said cathode layer comprises a dopant for the polymer.

14. The capacitor of claim 13, wherein the dopant comprises a complex of a metal cation and an organic acid.

15. The capacitor of claim 14, wherein the organic acid is a sulphonic acid.

16. The capacitor of claim 14, wherein the dopant includes Fe (III) tosylate.

17. The capacitor of claim 12, wherein the binder is present in the polymer in a concentration of 0.1 to 20 wt %.

18. The capacitor of claim 12, wherein the binder concentration is to 0.5 to 15 wt %.

19. The capacitor of claim 12, wherein the valve action material comprises tantalum metal or niobium metal or conductive niobium oxide.

20. The capacitor of claim 12, the capacitor having a DCL of less than 50 nA/CV.

21. The capacitor of claim 12, wherein the conductive thiophene polymer is poly(3,4-ethylenedioxythiophene).

* * * * *